UNITED STATES PATENT OFFICE.

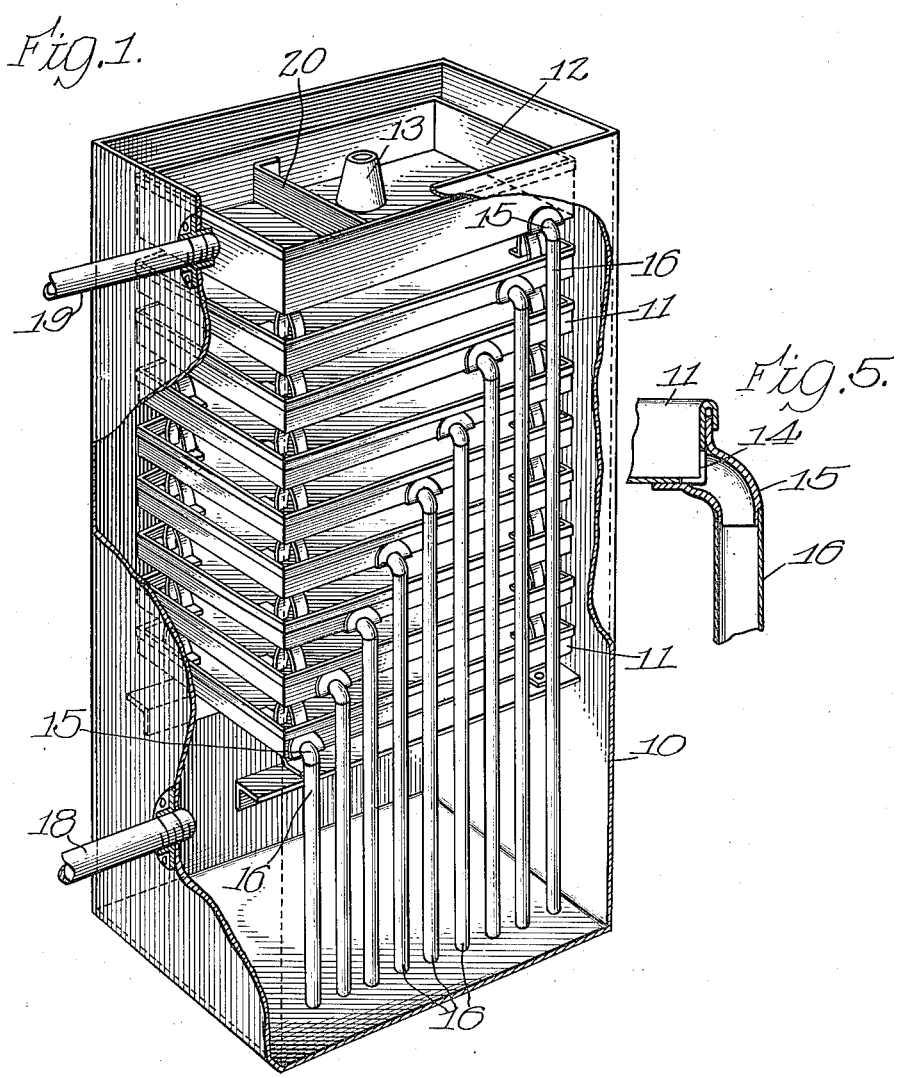

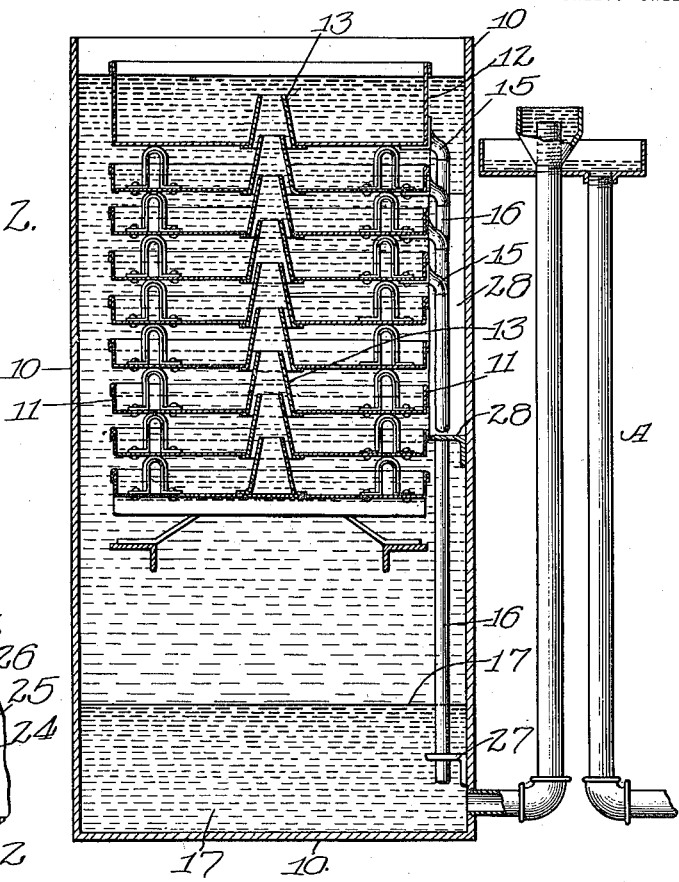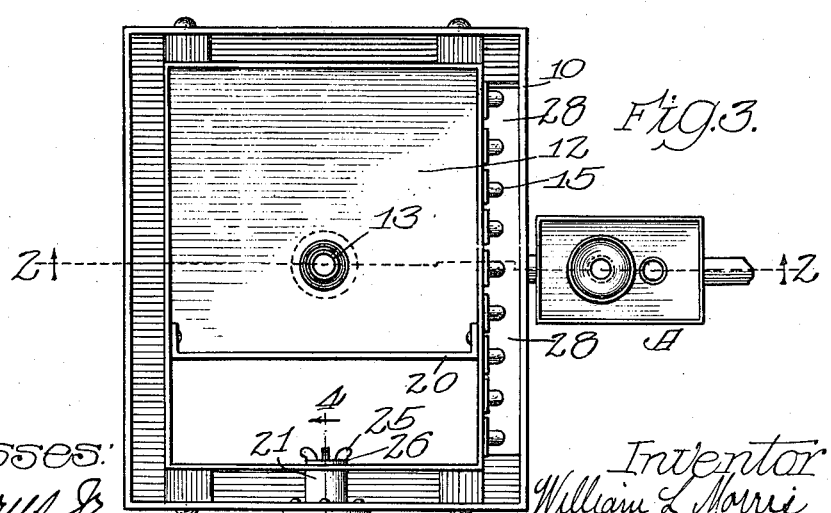

WILLIAM L. MORRIS, OF FORT WAYNE, INDIANA, ASSIGNOR TO S. F. BOWSER & COMPANY, INCORPORATED, OF FORT WAYNE, INDIANA.

SEPARATOR.

1,176,775.  Specification of Letters Patent.  Patented Mar. 28, 1916.

Application filed April 5, 1913. Serial No. 759,007.

*To all whom it may concern:*

Be it known that I, WILLIAM L. MORRIS, of Fort Wayne, in the county of Allen and State of Indiana, have invented certain new and useful Improvements in Separators, of which the following is a specification.

My invention relates to separators and has for its primary object the provision of a separator which shall have improved means for separating liquids and suspended impurities of different densities from a mixed state.

With the above and other objects in view, this invention consists substantially in the combination, arrangement and construction of parts all as hereinafter more fully described, illustrated in the accompanying drawings, which form a part of this specification and show the preferred embodiment of my invention, and more specifically set forth in the sub-joined claims.

In the drawings: Figure 1 is a perspective view of my invention with portions broken away; Fig. 2 is a vertical section of my invention taken approximately on the line 2—2 of Fig. 3 and looking in the direction indicated by the arrows; Fig. 3 is a top plan view of my invention; Fig. 4 is a vertical section of a portion of my invention taken on the line 4—4 of Fig. 3 and looking in the direction indicated by the arrows; Fig. 5 is a vertical section of a drainage nipple forming part of my invention and shows it attached to a precipitation pan and a drain pipe, the pan and pipe being sectioned and partly broken away.

Reference numeral 10 indicates a receptacle for liquids and suspended impurities of different densities in a mixed state, positioned within which is a series of precipitation pans 11 spaced one above the other and surmounted by a pan 12. Each of the pans 11 and 12 is provided with an upstanding nipple 13, the nipples being nested one within the other, preferably without touching, and each nipple preferably protruding somewhat above the lower extremity of the one next superposed. These nipples 13 form together a passageway for liquid rising from the successive pans 11 to the uppermost pan 12, and they are preferably disposed near the centers of the pans. The nipple 13 of the pan 12 terminates at its upper extremity somewhat below the upper edges of the pan itself. The pans 11 retard the flow of mixture to an extremely low velocity and likewise reduce greatly the distance the precipitating impurities must descend through the mixture. The upstanding nipples serve the purpose of interposing a uniform resistance for the rise of lighter liquid from one pan to the next. In other words, the mixture entering the receptacle 10 passes over all the pans 11 in unison, and by partially obstructing the upward passage from each pan to the next of the lighter liquid in the mixture the flow over the pans is reduced sufficiently to admit of the precipitation both of the globules of heavy liquid and of the impurities carried in by the liquid mixture. The superposed pan 12 serves the purpose of collecting the lighter of the liquids in the mixture as the lighter liquid rises.

In the use of my invention a stratum of the heavier liquid of the mixture collects at the bottom of the receptacle 10 and its upper level is indicated (see Fig. 2) by reference numeral 17. The intake pipe for the receptable 10 is shown in Fig. 1 and indicated by the numeral 18. Preferably this intake pipe is located above the upper level 17 of the stratum of heavy liquid and below the lowermost pan 11. The outlet pipe for the receptacle 10 is shown in Figs. 1, 3 and 4, and indicated by numeral 19. It communicates from without the receptacle 10 to the interior of the upper pan 12 and through the pan 12 with the body of liquid in the receptacle.

In order that the pans 11 and 12 may be readily removed from the receptacle, mechanism, illustrated in Fig. 4, is provided for joining the outlet 19 to the pan 12. In this mechanism a tapped tube 21, annularly flanged as at 22, is secured, preferably by rivets 23, to the receptacle 10 and abuts at its inner end against the pan 12, the receptacle 10 and the pan 12 being oppositely apertured for this purpose. The outlet pipe 19 is in threaded engagement with the outer end of the tapped tube 21, and a hollow nut 24, provided with wings 25 or other suitable gripping devices and flanged as at 26, passes through the aperture of the pan 12, and by threaded engagement with the inner end of the tapped tube 21, removably binds the pan and the tube 21 together. The point of outlet from the pan 12 to the outlet pipe 19 is at a level somewhat below the upper extremity of the nipple 13 of the pan 12. The pan 12 receives its supply of liquid from the nipple 13 and is preferably provided with a partition 20 positioned between the nipple and the outlet 19, the upper edge of the partition being at a level intermediate the upper edge of the pan 12 and the upper extremity of the nipple 13.

Each of the pans 11 and 12 is apertured for drainage as at 14 (see Fig. 5) and provided at its aperture with a depending drainage nipple 15, which is removably connected in a liquid-tight joint to a drain pipe 16, the pipe 16 forming an extension of the nipple and having its lower end sealed by insertion in the stratum of heavier liquid at the bottom of the receptacle 10. Separate drainage is thus provided between each pan and the stratum of heavier liquid at the bottom of the receptacle. Preferably the aperture 14 is disposed, as shown in Fig. 5, partly in the side and partly in the bottom of the precipitation pan. For properly positioning the drain pipes 16 they are preferably secured adjacent their upper and lower extremities to two pieces of angle iron 27 and 28, which are in turn fastened to the wall of the receptacle 10.

An overflow for the heavier liquid, generally indicated by the letter A, communicates with the stratum of heavier liquid at a point near the bottom of the receptacle 10 and controls the level 17 of heavier liquid within the receptacle. This overflow A is adjustable and in practice is so set as to allow the level 17 to be maintained not higher than the lowermost pan 11 and not as low as the outlet to the overflow.

It is to be understood that a separate drainage passage communicates from the drainage aperture of each pan directly to the stratum of heavier liquid lying at the bottom of the receptacle 10, and, while in practice I prefer to construct and position the drainage pipes in the manner shown in the drawings hereto annexed, the principle of this invention will not be violated by modification of this construction.

In the operation of my invention, a mixture of liquids of different densities and normally containing solid impurities in suspension is introduced to the receptacle 10 through the intake 18. With regard to its liquid constituents this mixture may be a coarse mechanical mixture or it may be a finely divided mixture or even one so finely divided as to form a perfect emulsion. In practice the mixture introduced is an emulsion more or less perfect. The mixture flowing into the receptacle rises until its upper level is high enough to overflow the partition 20. It fills all parts of the receptacle, pans, and drain pipes between this upper level and the bottom of the receptacle. The upper level is maintained by the position of the overflow 19 in the superposed pan 12. The rate of flow of the incoming mixture is in practice very slow and is governed by the grade of the mixture, that is, if the mixture is one of very coarse globules of the heavier liquid, such a flow is given to the mixture as will allow time for the precipitation of the globules of heavier liquid to the bottom of the receptacle and for the rise of the globules of lighter liquid to the pan 12; if, however, the mixture introduced is a perfect or a nearly perfect emulsion a greater time is naturally required for the separation of the heavier and lighter liquids and the influx of mixture to the receptacle is, consequently, made slower. As the mixture enters the receptacle 10 the larger globules of the heavier of the liquids gravitate to the bottom of the receptacle quickly, forming there the above mentioned seal for the lower extremities of the drain pipes 16. Similarly the larger globules of the lighter liquid in the mixture, after they have passed through the narrow opening between the upstanding nipple 13 of one pan and the nipple of the next superposed pan, rise quickly to the top of the receptacle through the passageway formed within the nest of nipples 13 and find their way into the pan 12, where they overflow the partition 20 and pass out through the outlet 19. All of the globules of the heavier liquid which are smaller than the largest, and all of the globules of the lighter liquid which are smaller than the largest, take their natural physical positions within the receptacle between the bottom and top thereof, but the flow of mixture is, as explained above, sufficiently slow to allow time for the natural physical separation of the globules of various sizes as they pass over the pans 11 by the flotation of those of the lighter liquid and the gravitation of those of the heavier liquid. In practice the precipitation pans are so constructed that each one occupies by far the greater portion of the horizontal cross-sectional area of the receptacle 10.

Heretofore great delay has been caused in the separation of such mixed liquids by the fact that the globules of heavier liquid gravitating from the various precipitation pans were blended in the mixture throughout their descent from the pans to the bottom of the receptacle. In my construction the drainage nipples 15 and the pipes 16 provide independent passageways for the gravitation of the precipitating heavier liquid directly from each pan to the stratum of heavier liquid at the bottom of the receptacle, thus permitting no intermingling of the precipitating heavier globules with the mixture contained in the receptacle below the point at which these heavier globules begin to gravitate. In this way, that is, by separating the gravitating globules of heavier liquid of each pan as they descend through that pan's drain pipe from the remainder of the mixture, I greatly facilitate the separation of the liquids in the mixture and allow them rapidly to assume their natural physical positions in the receptacle.

Various impurities of differing densities which enter into the receptacle 10 in suspension in the liquid mixture are collected at different heights in the receptacle upon the series of precipitation pans 11. Those of the impurities which are of greater density than the heavier liquid in the mixture will of course rapidly gravitate to the bottom of the receptacle without rising even to the level of the lowest pan; but those of lighter density will rise to a level determined by the relative density between them and the mixture in which they are carried. Thus some of the impurities will be carried up even to the uppermost of the precipitation pans 11, but, by reason of the retarding of the flow of mixture over each of the pans, these impurities are given time to settle and the close relation of the pans to each other reduces to a minimum the distance through which the impurities of different densities must gravitate. By the removable construction heretofore described the precipitation pans 11 are readily removed and freed of their deposits of impurities.

In the accompanying drawings and in the foregoing description are set forth the preferred embodiment of my invention, but it is obvious that one skilled in the art may make modifications of the same without departing from the principle of the invention.

I claim:

1. The combination with a receptacle for liquids, of a series of pans therein spaced one above the other, and an individual drain for each pan terminating adjacent the bottom of the receptacle.

2. The combination with a receptacle for liquids, of a series of precipitation pans therein spaced one above the other, a passageway communicating with each pan for the rise of liquid to the uppermost pan, and an individual drain for each pan terminating adjacent the bottom of the receptacle.

3. The combination with a receptacle for liquids, of a series of precipitation pans therein spaced one above the other, an inlet spaced from the bottom of the receptacle, an outlet communicating with the uppermost pan, and an individual drain for each pan terminating adjacent the bottom of the receptacle.

4. The combination with a receptacle for liquids, of a series of pans therein spaced one above the other, a passageway for the rise of liquid to the uppermost pan and communicating with each of the pans, an inlet for the receptacle spaced from the bottom thereof, an outlet for the receptacle communicating with the uppermost pan, a partition in the uppermost pan disposed between the outlet and said passageway and higher than the discharge point of the passageway and lower than the upper edge of the upper pan, and an individual drain for each pan terminating adjacent the bottom of the receptacle.

5. The combination with a receptacle for liquids, of a series of pans therein spaced one above the other, and an individual drain for each pan, said drain comprising a depending drainage nipple communicating with the pan through an aperture therein provided, and a drain pipe removably connected with the nipple in a liquid-tight joint and terminating at its lower extremity adjacent the bottom of the receptacle.

6. The combination with a receptacle for liquids, of a series of apertured pans therein spaced one above the other, a depending drainage nipple secured to each pan and communicating therewith through said aperture, and a series of drain pipes secured in fixed relation to the receptacle and removably connected to said nipples in a liquid-tight joint.

7. The combination with a receptacle for liquids, of a series of pans therein spaced one above the other, each pan having an aperture disposed partly in its side and partly in its bottom, and an individual drain for each pan communicating with it through said aperture and terminating adjacent the bottom of the receptacle.

8. The combination with a receptacle for liquids, of a series of removable pans therein spaced one above the other, and an individual drain for each pan terminating adjacent the bottom of the receptacle.

9. The combination with a receptacle for liquids, of a series of precipitation pans therein spaced one above the other, an upstanding tubular extension on each pan communicating with those of the other pans to form a passageway for the rise of liquid to the uppermost pan, an individual drain for each pan terminating adjacent the bottom of the receptacle, an intake spaced above the bottom of the receptacle and below the lowermost pan, an outlet communicating with the uppermost pan, and an adjustable overflow communicating with the receptacle adjacent the bottom thereof for governing the rise of liquid in the receptacle.

10. The combination with a receptacle for liquids, of a series of precipitation pans therein spaced one above the other, an inlet for the receptacle, an outlet for the receptacle, and an individual drain for each pan terminating adjacent the bottom of the receptacle.

11. The combination with a receptacle for liquids of a series of precipitation pans spaced one above another, with a passage through each pan except the lowermost over which a liquid passes in parallel to the uppermost pan, and an individual drain for each pan terminating adjacent the bottom of the receptacle.

12. The combination with a receptacle for liquids of a series of precipitation pans spaced one above another, a nipple upstanding from each pan protruding into the nipple above and forming a passage-way with resistance to the flow of liquid to cause it to pass uniformly over the pans to the uppermost one, and drains for the pans terminating adjacent the bottom of the receptacle.

In testimony whereof I have signed my name to this specification, in the presence of two subscribing witnesses, on this 21st day of March, A. D. 1913.

WILLIAM L. MORRIS.

Witnesses:
J. R. MATLACK,
L. W. THOMAS.